United States Patent
Charbonnel (10) Patent No.: US 12,540,570 B2
(45) Date of Patent: Feb. 3, 2026

(54) MODEL PREDICTIVE CONTROL FOR AFTERTREATMENT REGENERATION

(71) Applicant: Caterpillar Inc., Peoria, IL (US)

(72) Inventor: Sylvain J. Charbonnel, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 44 days.

(21) Appl. No.: 18/402,609

(22) Filed: Jan. 2, 2024

(65) Prior Publication Data

US 2025/0215818 A1 Jul. 3, 2025

(51) Int. Cl.
*F01N 9/00* (2006.01)

(52) U.S. Cl.
CPC .......... *F01N 9/002* (2013.01); *F01N 2560/06* (2013.01); *F01N 2610/03* (2013.01); *F01N 2900/0402* (2013.01); *F01N 2900/1602* (2013.01)

(58) Field of Classification Search
CPC ...... F01N 9/002; F01N 11/002; F01N 11/005; F01N 2610/03; F01N 2900/04; F01N 2900/0402; F01N 2900/1404; F01N 2900/1602
See application file for complete search history.

(56) References Cited

U.S. PATENT DOCUMENTS

| | | | |
|---|---|---|---|
| 8,265,854 B2 | 9/2012 | Stewart et al. | |
| 8,384,397 B2 | 2/2013 | Bromberg et al. | |
| 9,771,883 B1 | 9/2017 | Haskara et al. | |
| 10,605,187 B2 | 3/2020 | Wang et al. | |
| 11,125,209 B2 | 9/2021 | Kjaer et al. | |
| 11,619,189 B2 | 4/2023 | Pekar et al. | |
| 11,674,422 B2 | 6/2023 | Norris et al. | |

(Continued)

FOREIGN PATENT DOCUMENTS

| | | |
|---|---|---|
| CN | 108868976 B | 1/2021 |
| CN | 113090365 A | 7/2021 |

(Continued)

OTHER PUBLICATIONS

Machine translation of DE-102018220615-A1, accessed Apr. 9, 2025. (Year: 2025).*

(Continued)

*Primary Examiner* — Jonathan R Matthias
(74) *Attorney, Agent, or Firm* — Bookoff McAndrews PLLC (57) ABSTRACT

In one instance, disclosed herein is an aftertreatment regeneration system comprising: an aftertreatment system; a temperature sensor operative to monitor a temperature of the aftertreatment system; a hydrocarbon doser operatively coupled to the aftertreatment system; and a model predictive controller operative to: receive an aftertreatment regeneration request; receive temperature information generated by the temperature sensor; generate, based on the aftertreatment regeneration request and the temperature information generated by the temperature sensor, a predicted future state of the aftertreatment system; and generate, based on the aftertreatment regeneration request, the temperature information generated by the temperature sensor, and the predicted future state of the aftertreatment system, a control command for actuating the hydrocarbon doser.

16 Claims, 4 Drawing Sheets

(56) References Cited

U.S. PATENT DOCUMENTS

2018/0149059 A1* 5/2018 Fröberg ............... F01N 11/005
2018/0340784 A1* 11/2018 Upadhyay ............ F01N 9/007
2019/0360415 A1* 11/2019 Romanato ........... F02D 41/405
2020/0063632 A1* 2/2020 Hendrickson ........ F01N 3/2066
2020/0408112 A1* 12/2020 Koppauer ............. F02G 5/02
2021/0164371 A1* 6/2021 Kim .................... F01N 9/002
2022/0316377 A1* 10/2022 Norris ................. F01N 3/2066

FOREIGN PATENT DOCUMENTS

| CN | 113110103 A | 7/2021 | |
| CN | 113128110 B | 4/2022 | |
| DE | 102018218960 A1 * | 5/2020 | ............ B60W 30/18 |
| DE | 102018220615 A1 * | 6/2020 | |
| DE | 102020200085 A1 | 7/2020 | |
| EP | 2923050 B1 | 12/2017 | |
| WO | 2022235314 A1 | 11/2022 | |

OTHER PUBLICATIONS

Machine translation of DE-102018218960-A1, accessed Aug. 4, 2025. (Year: 2025).*
Extended European search Report for EP Patent Appln. No. 24217622.0, mailed Apr. 4, 2025 (8 pgs).

* cited by examiner

MODEL PREDICTIVE CONTROL FOR AFTERTREATMENT REGENERATION

TECHNICAL FIELD

The present disclosure relates generally to aftertreatment systems, and more particularly, to methods and systems for controlling the hydrocarbon dosing of an aftertreatment regeneration system.

BACKGROUND

Internal combustion engines that generate at least part of the energy for operating a machine are subjected to various regulations regarding the type and/or amount of emissions produced by the internal combustion engine. For example, some regulations set a limit on the amount of gaseous emissions, such as nitrogen oxides ($NO_x$), carbon dioxide ($CO_2$), or ammonia ($NH_3$), and/or the amount of particulate emissions from the internal combustion engine. To this end, some internal combustion engines include an aftertreatment system that processes the exhaust produced by the internal combustion engine to reduce the amount of undesirable compounds included therein.

As an aftertreatment system is used to reduce the amount of gaseous emissions included in the exhaust produced by an internal combustion engine, residue accumulates within the aftertreatment system and negatively impacts the aftertreatment system's efficiency and longevity. The residue that accumulates within an aftertreatment system can be reduced or eliminated through an aftertreatment regeneration process. In many aftertreatment regeneration processes, a hydrocarbon doser injects a small amount of fuel into the aftertreatment system, which combusts and causes the aftertreatment system to generate enough heat over a long enough period of time to effectively burn away the accumulated residue. Such an aftertreatment regeneration process is typically controlled by a proportional-integral-derivative (PID) controller.

German patent application number DE102018218960.9A, filed on Nov. 7, 2018 ("the '960 application"), describes a method for controlling a drive train of a motor vehicle with an internal combustion engine using model predictive control to minimize emissions or fuel consumption. In the method of the '960 application, discontinuous events such as a particle filter regenerations can be taken into account by the model predictive control when controlling the drive train of the motor vehicle. However, the '960 application does not disclose, for example, using model predictive control to control an aftertreatment regeneration process.

The methods and systems of the present disclosure may solve one or more of the problems set forth above and/or other problems in the art. The scope of the protection provided by the present disclosure, however, is defined by the attached claims, and not by the ability to solve any specific problem.

SUMMARY

In one aspect, an aftertreatment regeneration system comprises: an aftertreatment system; a temperature sensor operative to monitor a temperature of the aftertreatment system; a hydrocarbon doser operatively coupled to the aftertreatment system; and a model predictive controller operative to: receive an aftertreatment regeneration request; receive temperature information generated by the temperature sensor; generate, based on the aftertreatment regeneration request and the temperature information generated by the temperature sensor, a predicted future state of the aftertreatment system; and generate, based on the aftertreatment regeneration request, the temperature information generated by the temperature sensor, and the predicted future state of the aftertreatment system, a control command for actuating the hydrocarbon doser.

In another aspect, a method for controlling an aftertreatment regeneration process for an aftertreatment system including an aftertreatment system and a hydrocarbon doser operatively coupled to the aftertreatment system comprises: receiving an aftertreatment regeneration request; receiving temperature information generated by at least one temperature sensor operative to monitor a temperature of the aftertreatment system; generating, based on the aftertreatment regeneration request and the temperature information generated by the at least one temperature sensor, a plurality of predicted future states of the aftertreatment system for a respective plurality of future time steps; and generating, based on the aftertreatment regeneration request, the temperature information generated by the at least one temperature sensor, and the plurality of predicted future states of the aftertreatment system, a control command for actuating the hydrocarbon doser.

In another aspect, a model predictive controller for controlling an aftertreatment regeneration process for a machine including an oxidation catalyst and a hydrocarbon doser operatively coupled to the aftertreatment system is operative to: receive an aftertreatment regeneration request; receive temperature information generated by at least one temperature sensor operative to monitor a temperature of the aftertreatment system; generate, based on the aftertreatment regeneration request and the temperature information generated by the at least one temperature sensor, a predicted future state of the aftertreatment system; and generate, based on the aftertreatment regeneration request, the temperature information generated by the at least one temperature sensor, and the predicted future state of the aftertreatment system, a control command for actuating the hydrocarbon doser.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus. Moreover, in this disclosure, relative terms, such as, for example, "about," "substantially," "generally," and "approximately" are used to indicate a possible variation of +10% in the stated value.

Figure 1:
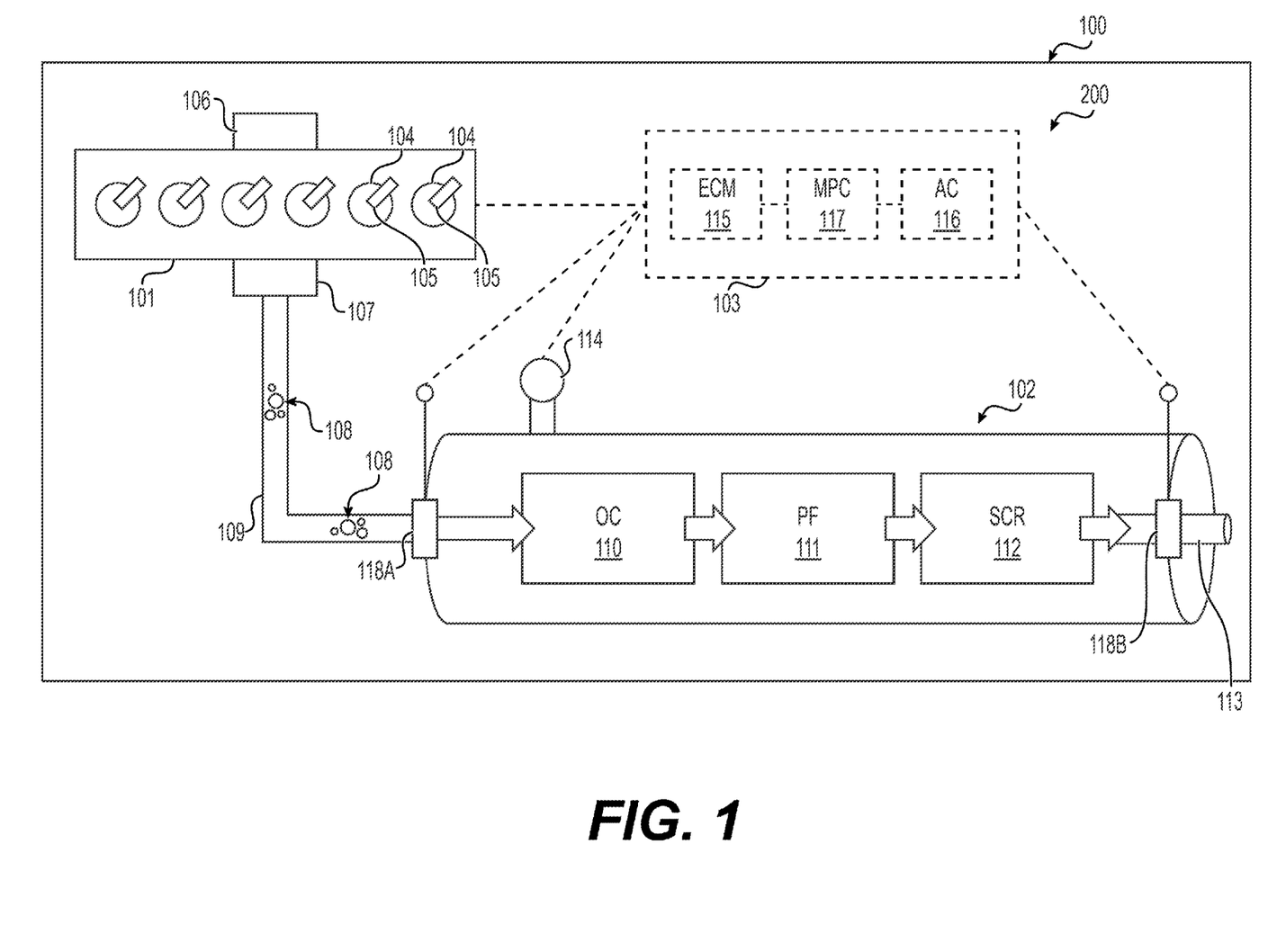
FIG. 1 depicts a schematic diagram of a machine including an internal combustion engine, an aftertreatment system, and one or more controllers.

FIG. 1 depicts a schematic diagram of a machine 100 that includes an internal combustion engine 101, an aftertreatment system 102, and one or more controllers 103 that may be part of an aftertreatment regeneration system 200. Machine 100 may be configured to perform various operations associated with an industry, such as mining, construction, farming, transportation, power generation, or any other suitable industry. For example, machine 100 may be a mobile machine, such as an on-highway vocational vehicle, an off-highway haul truck, an excavator, a dozer, a loader, a motor grader, paving machine, drilling machine or any other suitable mobile machine. Or for example, machine 100 may be a stationary machine, such as a generator set, a furnace, or any other suitable stationary machine.

In general, internal combustion engine (ICE) 101 functions to receive a fuel, such as diesel fuel, combust the fuel, and output mechanical power. While the present disclosure discusses instances in which the ICE 101 is configured to combust diesel fuel, it should be understood that the ICE 101 may be configured to combust other fuels, such as gasoline or natural gas, either alone or in a dual fuel system that also combusts diesel fuel. As depicted in FIG. 1, in some instances, ICE 101 includes a plurality of components or subsystems, such as a plurality of cylinders 104, a respective plurality of fuel injectors 105, an intake manifold 106 and associated intake components (not shown), and an exhaust manifold 107. ICE 101 may also include an exhaust gas recirculation system (not shown).

The intake manifold 106 may receive air (e.g., compressed air) from an air intake or induction system and deliver the air to the cylinders 104. Within a cylinder 104, the air may then be mixed with diesel fuel supplied to the cylinder 104 by a fuel injector 105. The mixture of air and fuel is then ignited, causing combustion that can then be converted into mechanical power, such as by driving a piston disposed within the cylinder 104 to turn a crankshaft (not shown). The product(s) 108 of the combustion of the air and fuel mixture (hereinafter, "exhaust") may then be expelled from the cylinder 104, collected by the exhaust manifold 107, and delivered to the aftertreatment system 102, such as via an exhaust passage 109.

As depicted in FIG. 1, in some instances, an aftertreatment system 102 includes a plurality of components or subsystems, such as an oxidation catalyst (OC) 110 (e.g., a diesel oxidation catalyst), a particulate filter (PF) 111 (e.g., a diesel particulate filter), and a selective catalytic reduction (SCR) system 112. When exhaust 108 is delivered from the ICE 101 to the aftertreatment system 102, the exhaust 108 is first passed through the OC 110, where harmful or undesired emissions such as carbon monoxide and hydrocarbons in the exhaust 108 are oxidized into carbon dioxide and water. Next, the exhaust 108 is passed through the PF 111, where solid particles (e.g., carbon particulates) in the exhaust 108 are trapped before they can exit the machine 100. Finally, the exhaust 108 is passed through an SCR system 112, where nitrogen oxides in the exhaust 108 are reduced into nitrogen before they exit the machine 100. After the exhaust 108 has been passed through the OC 110, the PF 111, and the SCR 112, the remaining exhaust 108 (containing, e.g., carbon dioxide, water, and nitrogen) may be safely emitted from the machine 100, such as through an exhaust pipe 113. It should be understood that these components of an aftertreatment system 102 are exemplary only, and that additional and/or different components may be included in various instances depending on the configuration of the machine 100. For example, an aftertreatment system 102 may include an OC 110 and a PF 111 but may not include an SCR 112. Or for example, an aftertreatment system 102 may include a PF 111 and an SCR 112 but may not include an OC 110. Or for example, an aftertreatment system 102 may include only a PF 111. In some instances, a PF 111 may include or otherwise perform the function of an OC 110 (e.g., the PF 111 may be a catalyzed particle filter capable of oxidizing hydrocarbons and carbon monoxide included in the exhaust 108 and trapping solid particles included in the exhaust 108. Similarly, the relative location of each component of the aftertreatment system 102 may be changed without limiting the scope of the present disclosure.

As solid particles accumulate in the PF 111, however, the efficiency and longevity of the aftertreatment system 102 may be negatively affected. To eliminate the solid particles that accumulate in the PF 111, an aftertreatment regeneration process is used, where hydrocarbons (e.g., diesel fuel) are injected by a hydrocarbon (HC) doser 114 into the exhaust 108, upstream of the OC 110. In some instances, the ICE 101 includes or otherwise performs the function of an HC doser 114 (e.g., hydrocarbons may be injected into the exhaust 108 by one or more fuel injectors 105 included in the ICE 101). The hydrocarbons injected into the exhaust 108 by the HC doser 114 are oxidized by the OC 110 in a reaction that increases the temperature of the exhaust 108 to over 600° C. At this temperature, over a sustained period of time (e.g., thirty minutes), most or all of the solid particles in the PF 111 will oxidize into carbon dioxide and be safely emitted from the machine 100. However, aftertreatment regeneration processes must be carefully executed. If the temperature of the exhaust 108 becomes too high, the aftertreatment system 102 may be damaged. If the temperature of the exhaust 108 is too low, not all of the solid particles in the PF 111 will be eliminated, or the aftertreatment regeneration process will be prolonged, thereby wasting fuel.

As depicted in FIG. 1, in some instances, the machine 100 includes one or more controllers 103 to control systems or processes of the machine 100, such as the ICE 101 or the aftertreatment regeneration process described above. For example, as depicted in FIG. 1, the machine 100 may include an electronic control module (ECM) 115 that controls the ICE 101, and an actuator controller (AC) 116 that controls the HC doser 114 during an aftertreatment regeneration process. The machine 100 may include a model predictive control (MPC) module 117 that controls an aftertreatment regeneration process for the aftertreatment system 102, as described in further detail below. A controller 103 may include one or more processors and one or more memories. Various other suitable components, e.g., power supply circuitry, signal conditioning or processing circuitry, or the like, may also be included in a controller 103 in various instances. In some instances, the one or more controllers 103 may be operatively coupled to one or more actuators, such as HC doser 114, or one or more sensors, such as temperature sensors 118A and 118B. In some instances, the one or more controllers 103 are communicatively coupled. In some instances, the ECM 115, AC 116, and MPC 117 are all components of a single controller 103. As used herein, the term "controller" includes both single controllers and multiple controllers.

The machine 100 may also include various sensors for monitoring or measuring various functions of the machine 100. The various sensors of the machine 100 may be operatively coupled to one or more controllers 103. In some instances, the machine 100 includes one or more temperature sensors, e.g., temperature sensors 118A and 118B. For example, a temperature sensor 118A or 118B may be an intake manifold air temperature (IMAT) sensor. Temperature sensors may be used by the machine 100 to gauge or monitor the temperature of various elements, components, or systems of the machine 100. For example, as depicted in FIG. 1, the machine 100 may include a first temperature sensor 118A immediately upstream of the aftertreatment system 102, to gauge the temperature of exhaust 108 as it enters the aftertreatment system 102, and a second temperature sensor 118B immediately downstream of the aftertreatment system 102, to gauge the temperature of exhaust 108 as it exits the aftertreatment system 102. In some instances, one or more temperature sensors are disposed within the aftertreatment system 102, or are virtual sensors (e.g., simulated temperature values). For example, a temperature sensor may be provided at any appropriate position within a canister in which any component of the aftertreatment system 102 is contained. The machine 100 may include any other suitable sensors. For example, the machine 100 may include flow sensors, pressure sensors, speed sensors, etc. In some instances, the machine 100 includes one or more sensors used to determine a flow rate of the exhaust 108, such as an intake manifold absolute pressure (IMAP) sensor.

The machine 100 may also include one or more sensors that can be used to determine when an aftertreatment regeneration process should be initiated. In some instances, the machine 100 includes one or more emissions sensors that measure a quantity or concentration of emissions produce by the ICE 101. For example, the machine 100 may include a first emissions sensor upstream of the aftertreatment system 102 and a second emissions sensor downstream of the aftertreatment system 102. In this example, sensor signals generated by the first and second emissions sensors may be received and compared by a controller 103 (e.g., ECM 115) to gauge or monitor the efficiency of the aftertreatment system 102. If the efficiency of the aftertreatment system 102 falls below a threshold efficiency, the controller 103 may determine that an aftertreatment regeneration process should be initiated. In some examples, the aftertreatment system 102 includes one or more particulate matter sensors (e.g., soot sensors) that gauge or monitor a quantity or concentration of solid particles present within the PF 111. In these examples, sensor signals generated by the one or more particulate matter sensors may be received by a controller 103. If the quantity or concentration of solid particles present within the PF 111 exceeds a threshold value, the controller 103 may determine that an aftertreatment regeneration process should be initiated.

Figure 2:
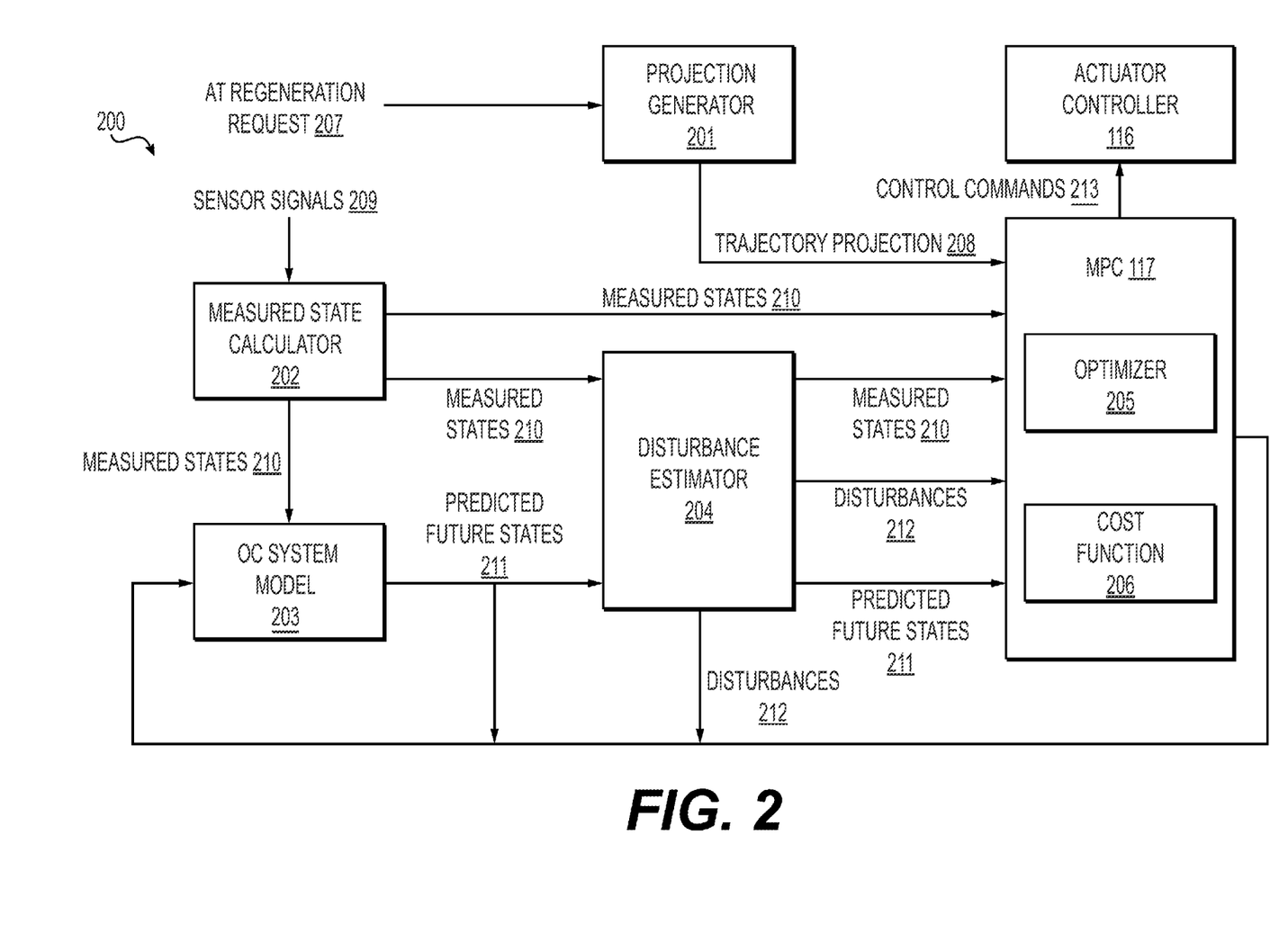
FIG. 2 depicts a block diagram of a aftertreatment regeneration system for controlling an aftertreatment regeneration process.

FIG. 2 depicts a block diagram of an aftertreatment regeneration system 200. In general, an aftertreatment regeneration system 200 includes an aftertreatment system 102 and one or more components or systems suitable for facilitating an aftertreatment regeneration process for the aftertreatment system 102, such as an HC doser 114 and one or more controllers 103. As depicted in FIG. 2, an aftertreatment regeneration system 200 may include a model predictive control module (MPC) 117. An MPC 117 may also be referred to as a "model predictive controller" 117. A model predictive controller is a multiple input, multiple output (MIMO) controller, which is a type of controller that is capable of controlling a system with more than one input and more than one output. However, MIMO controllers are capable of controlling systems that have a single input and multiple outputs, or multiple inputs and a single output. In contrast to single input, single output (SISO) controllers, which can be effective for relatively simple systems, MIMO controllers are better suited for more dynamic and complex systems. For example, given the current state(s) of a system and the desired state(s) of the system, a model predictive controller can predict future states of the system and make control decisions based on these predicted future states. In this way, a model predictive controller may be considered anticipatory. A model predictive controller may be constrained or unconstrained, linear or non-linear.

As depicted in FIG. 2, in some instances, an aftertreatment regeneration system 200 additionally includes or is otherwise operatively coupled to one or more components or modules, such as a projection generator 201, a measured state calculator 202, a system model 203 of an aftertreatment system 102 (referred to hereinafter as an "AT system model" 203), and a disturbance estimator 204. As depicted in FIG. 2, in some instances, an MPC 117 includes an optimizer 205 and a cost function 206. In general, the components or modules of the MPC 117 function cooperatively to receive an aftertreatment regeneration request 207, receive temperature information from one or more temperature sensors 118A or 118B, generate predicted future states of the aftertreatment system 102, and generate control commands 213 for actuating the HC doser 114. The control commands 213 may include one or more sets of control points, as described below.

Projection generator 201 may be configured to receive an aftertreatment regeneration request 207 from a controller 103, such as from ECM 115, thereby initiating a new aftertreatment regeneration process. An aftertreatment regeneration request 207 may be received from a controller 103 on a periodic basis, such as once per day or once per week, or in response to a particular event, such as the machine 100 reaching a particular number of hours of operation, miles driven, or particulate matter accumulated since a prior aftertreatment regeneration process. An aftertreatment regeneration request 207 may include a target temperature for the aftertreatment regeneration process and a target duration of time for maintaining the target temperature as part of the aftertreatment regeneration process. The target temperature included in an aftertreatment regeneration request 207 may represent a range of acceptable temperatures. For example, temperatures within five percent of the target temperature included in an aftertreatment regeneration request 207 may be acceptable for an aftertreatment regeneration process.

After receiving the aftertreatment regeneration request 207, the projection generator 201 can generate a trajectory projection 208 over a time horizon including a predetermined number of future time steps. The trajectory projection 208 is then outputted to the MPC 117. At each future time step, the trajectory projection 208 includes a projected value of the temperature of the exhaust 108 within the aftertreatment system 102. The algorithm used to generate the trajectory projection 208 can include an exponential decay, a constant, or a recursive calculation. The trajectory projection 208 may be based at least in part on the current temperature of the exhaust 108 within the aftertreatment system 102 (e.g., as determined by temperature sensor 118A or 118B) and the target temperature included in the aftertreatment regeneration request 207. In some instances, the trajectory projection 208 is generated at least in part by using a Kalman filtering technique (e.g., an output of a Kalman filter operation may be used an input by the projection generator 201). In some instances, the time horizon included in the trajectory projection 208 may be of infinite length while remaining solvable and computationally viable.

Measured state calculator 202 may be configured to receive sensor signals 209 from sensors included in the machine 100 and convert the sensor signals 209 into measured states 210 that represent or estimate states or conditions of components of the machine 100. The measured state calculator 202 may then output the measured states 210 to the AT system model 203 or the MPC 117. For example, in some instances, measured state calculator 202 receives sensor signals 209 from temperature sensor 118A or 118B and converts the sensor signals 209 into measured states 210 that represent or estimate the temperature of the exhaust 108 within the aftertreatment system 102. Measured states 210 representing or estimating the temperature of the exhaust 108 within the aftertreatment system 102 may be referred to as "temperature information" from or generated by temperature sensor 118A or 118B.

In some instances, the AT system model 203 includes a model of the aftertreatment system 102. For example, the AT system model 203 may include a model of one or more components of the aftertreatment system 102, such as the OC 110, the PF 111, and the SCR 112. In some instances, the AT system model 203 includes a model of the entire aftertreatment system 102. For example, the AT system model 203 may include one or more mathematical or thermodynamic relationships representing or estimating the interactions of the OC 110 with exhaust 108. Or for example, the AT system model 203 may include one or more mathematical or thermodynamic relationships representing or estimating the dynamic interactions of the OC 110 and the PF 111 with exhaust 108.

In some instances, the aftertreatment regeneration system 200 uses the AT system model 203 to estimate or predict future states 211 of the aftertreatment system 102 over a time horizon (e.g., the time horizon over which a trajectory projection 208 is generated by the projection generator 201, as described above). When the projection generator 201 receives an aftertreatment regeneration request 207 and generates a trajectory projection 208 over a time horizon including a predetermined number of future time steps, the AT system model 203 may generate a predicted future state 211 of the aftertreatment system 102, e.g., one or more predicted future temperatures of the aftertreatment system 102, for each future time step included in the predetermined number of future time steps. The aftertreatment regeneration system 200 may use the AT system model 203 to generate any number of predicted future states 211 of the aftertreatment system 102. For example, if a trajectory projection 208 generated by the projection generator 201 includes a time horizon of three future time steps, the aftertreatment regeneration system 200 may use the AT system model 203 to generate three predicted future states, one for each of the three future time steps of the time horizon. In some instances, when generating one or more predicted future states 211 of the aftertreatment system 102, the AT system model 203 receives, as an input, at least measured states 210, e.g., temperature information generated by temperature sensor 118A or 118B. In some instances, when generating one or more predicted future states 211 of the aftertreatment system 102, the AT system model 203 receives, as an input, estimated disturbances 212, as described below. After generating one or more predicted future states 211 of the aftertreatment system 102, the AT system model 203 may output the one or more predicted future states 211 to the disturbance estimator 204 or the MPC 117.

The aftertreatment regeneration system 200 may use the AT system model 203 to generate one or more estimated internal temperatures of the aftertreatment system 102. The one or more estimated internal temperatures of the aftertreatment system 102 may correspond to one or more respective positions or locations within the OC 110, the PF 111, and the SCR 112. For example, in some instances, in response to receiving an aftertreatment regeneration request 207, the aftertreatment regeneration system 200 uses the AT system model 203 to generate a first estimated internal temperature of the aftertreatment system 102 near the front end of the aftertreatment system 102, e.g., the inlet end of the aftertreatment system 102 at which exhaust 108 first encounters the OC 110; a second estimated internal temperature near the middle of the aftertreatment system 102, e.g., at the PF 111; and a third estimated internal temperature near the back end of the aftertreatment system 102, e.g., the outlet end of the aftertreatment system 102 at which exhaust 108 ultimately exits the machine 100. Or for example, the aftertreatment regeneration system 200 may use the AT system model 203 to generate a plurality of estimated internal temperatures of any one component of the aftertreatment system 102, such as the OC 110. In some instances, an estimated internal temperature generated by the AT system model 203 is based at least in part on measured states 210, e.g., temperature information generated by temperature sensor 118A or 118B. In some instances, a predicted future state 211 of the aftertreatment system 102 (e.g., a predicted future temperature of the aftertreatment system 102) generated by the AT system model 203 is based at least in part on one or more estimated internal temperatures generated by the AT system model 203. A predicted future state 211 of the aftertreatment system 102 may include a plurality of elements, such as a plurality of predicted future temperatures of the aftertreatment system 102 (e.g., a first predicted future temperature of the OC 110, a second predicted future temperature of the PF 111, and a third predicted future temperature of the SCR 112, generated the for the same future time step).

Disturbance estimator 204 may receive a measured state 210 (e.g., temperature information generated by temperature sensor 118A or 118B) from the measured state calculator 202 and a predicted future state 211 from the AT system model 203 (e.g., a predicted future temperature of the aftertreatment system 102) corresponding to equivalent time steps and determine an amount of deviation between the two, as well as an amount of deviation between previously-predicted futures state 211 and actual states represented by measured state 210. Based on the deviation between the measured state 210 and the predicted future state 211, the disturbance estimator 204 may be configured to calculate an estimated disturbance 212. Estimated disturbances 212 may be an estimation of internal disturbances that are not or cannot be directly measured and which may represent, for example, physical realities that are not reflected in the AT system model 203. Estimated disturbances 212 may be outputted with predicted future states 211 to the MPC 117. Estimated disturbances 212 may be outputted to the AT system model 203, where they can be used to update, correct, or otherwise improve the AT system model 203. While disturbance estimator 204 may be configured to estimate internal disturbances that are not or cannot be directly measured, a "disturbance" may also include an external disturbance. An external disturbance may include measured and/or calculated values that correspond to external disturbances that affect the performance of one or more components of the machine 100. An external disturbance may be measured via one or more sensors or otherwise calculated by a controller 103.

MPC 117 may be a constrained or unconstrained, linear or non-linear model predictive controller including an optimizer 205 and a cost function 206. In general, the components of the MPC 117 function cooperatively to: 1) generate multiple sets of candidate control points for actuating one or more components of the machine 100 to meet a target objective and 2) select an optimal set of control points (e.g., in the form of a control law) from the multiple sets of candidate control points. To perform this optimization process, the sets of candidate control points are evaluated by the optimizer 205 based on cost information stored within the cost function 206, and the set of candidate control points associated with lowest cost may be selected as the optimal set of control points. This optimization process can be performed in the form of functional predictive control, wherein the cost of a set of candidate control points is based on meeting the target objective at only one future time step, or in the form of general predictive control, wherein the cost is based on meeting the target objective, or multiple target objectives, at multiple future time steps. Similarly this optimization process may be based on an open loop algorithm or a closed loop algorithm. In some instances, both the inputs and the outputs of the MPC 117 are constrained, such as by using soft or hard constraints, as described below. In other instances, both the inputs and the outputs of the MPC 117 are unconstrained. In still other instances, the inputs of the MPC 117 are constrained, while the outputs of the MPC 117 are unconstrained. In some instances, the inputs of the MPC 117 are unconstrained, while the outputs of the MPC 117 are constrained. However, the MPC 117 may be configured in any other suitable way.

In an exemplary configuration, the MPC 117 is an open loop, constrained model predictive controller (with hard constraints on inputs and soft constraints on outputs) that generates multiple sets of candidate control points and selects an optimal set of control points based on a linearized version of the AT system model 203 and in the form of general predictive control. The optimal set of control points is then outputted to an actuator controller 116. Linearization of the AT system model 203 (e.g., by a perturbation technique or by symbolic derivation) may facilitate approximations of the behaviors modeled by AT system model 203 and may be performed periodically, e.g., each time an optimal set of control points is outputted to the actuator controller 116. This linearization may reduce the complexity of the calculations performed by the optimizer 205, as described below, and thereby enable the optimizer 205 to more quickly select an optimal set of control points, when compared to a non-linear MPC.

In some instances, the MPC 117 may receive, as inputs, a trajectory projection 208, measured states 210, and predicted future states 211. For example, the MPC 117 may receive, an inputs: 1) a plurality of projected values of the temperature of exhaust 108 over a respective plurality of future time steps; 2) temperature information generated by temperature sensor 118A or 118B; and 3) a plurality of predicted future temperatures of the OC 110 over the respective plurality of future time steps. The MPC 117 may also receive, as an input, one or more estimated internal temperatures, as described above. The MPC 117 may also receive, as an input, estimated disturbances 212. In some instances, the MPC 117 may additionally or alternatively receive, as an input, measured disturbances (not shown). However, the MPC 117 may receive any other number or combination of inputs.

As mentioned above, after receiving various input(s), the MPC 117 can then generate, based on the input(s), multiple sets of candidate control points, and the optimizer 205 can evaluate the multiple sets of candidate control points based on cost information stored within the cost function 206. For example, using the cost information stored within the cost function 206, the optimizer 205 may determine cost values corresponding to each control point included in a set of candidate control points. A cost value may represent the expected cost of a control point being used as a command to actuate a component of the machine 100. For example, the actuation of a component of the machine 100 may be associated with an energy cost, a degradation cost, or an emissions cost. However, the actuation of a component of the machine 100 may be associated with any number of different types of costs. The cost values associated with a candidate control point may be calculated over the entirety of a time horizon included in a trajectory projection 208 received by the MPC 117, as described above. In some instances, the greater the magnitude of a change in the position of a component of the machine 100 that would be actuated by a control point, the greater the cost value(s) associated with that control point will be.

In some instances, the cost function 206 of the MPC 117 may be programmed with one or more soft constraints, such that the MPC 117 is allowed to select an optimal set of control points from multiple sets of candidate control points without considering any hard constraints. However, additional or penalty costs may be applied to a candidate control point if the candidate control point would cause a soft constraint to be exceeded, e.g., in a positive or negative direction. As used herein, an "unconstrained" model predictive controller employs one or more soft constraints, but does not use any hard constraints. As used herein, a "soft constraint" corresponds to one or more values that are associated with additional or penalty costs, but are otherwise available for selection or utilization by the MPC 117. In contrast, a "hard constraint" corresponds to one or more values that are not available for selection or utilization by the MPC 117 under any circumstances. The use of soft constraints may ensure that the optimizer 205 is able to identify an optimal set of control points for each optimization process performed by the MPC 117. For example, soft constraints employed by an unconstrained MPC may be suitable for controlling the actuations of components of the machine 100 that interact with one or another, and may help the MPC 117 avoid complex analyses that could otherwise result in the selection of a sub-optimal set of control points in order to avoid a particular hard constraint.

For example, in some instances, a soft constraint utilized by the MPC 117 may be a critical oxidation catalyst temperature, e.g., a temperature at which the efficiency of the OC 110 may fall below a threshold efficiency, or a temperature at which the OC 110 may be damaged. In such an instance, a first control point, the actuation of which might cause the temperature of the OC 110 to rise above a critical oxidation temperature, may be associated by the cost function 206 with a cost that is greater than that of a second control point, the actuation of which would not cause the temperature of the OC 110 to rise above the critical oxidation temperature. However, if a particular set of candidate control points including the first control point were to represent the most efficient way to execute an aftertreatment regeneration process, the optimizer 205 may still select the particular set of candidate control points as an optimal set of control points, despite that optimal set of control points including a control point that, if actuated, might cause the temperature of the OC 110 to rise above the critical oxidation catalyst temperature.

The generation of multiple sets of candidate control points may be performed using one or more search strategies, as algorithms, to facilitate the identification of suitable sets of candidate control points and thereby expedite the selection of an optimal set of control points. In some instances, a search strategy employed by the MPC 117 may be targeted, e.g., based one or more previously identified sets of candidate control points or one or more previously selected optimal sets of control points. In some instances, the MPC 117 is configured to perform a random or semi-random search (e.g., via a Latin Hyper Cube algorithm, Particle Swarm technique, or any other similar and suitable technique) in order to identify sets of candidate control points that would not likely be identified by performing a targeted search. Other suitable search strategies may be based on matrix inversion, gradient search (e.g., conjugate gradient, steepest descent, Broyden-Fletcher-Goldfarb-Shanno (BFGS), or first rank), dynamic differential programming, or a hybrid technique (e.g., a random or semi-random search followed by a gradient search). In some instances, the MPC 117 is configured to perform a plurality of search strategies in parallel. Search strategies that may be performed in parallel may include for example, a random search, a grid-based search, or matrix inversion searching. The results of the parallel searches may be compared such that the most suitable sets of candidate control points is selected from among the different searches. However, the MPC 117 may be configured to search for multiple sets of candidate control points in any other way.

INDUSTRIAL APPLICABILITY

The disclosed aspects of the present disclosure may be applied to a variety of engines, and machines and/or vehicles that incorporate these engines to generate power to move the machine, power an implement, generate electrical energy, etc. For example, the aftertreatment regeneration system of the present disclosure may facilitate safer and more efficient aftertreatment regeneration processes for aftertreatment systems of machines that include internal combustion engines.

As mentioned above, an ICE 101 of a machine 100 combusts fuel to produce mechanical power that can be used by the machine 100 to move or do work. The combustion of fuel within the ICE 101 produces exhaust 108 that may include harmful or undesirable emissions. These emissions may be reduced or eliminated by an aftertreatment system 102 operatively coupled to the ICE 101. Over time, residue such as particulate matter accumulates within the aftertreatment system 102 and negatively impacts the efficiency or longevity of the aftertreatment system 102. Residue accumulated within the aftertreatment system 102 may be reduced or eliminated through an aftertreatment regeneration process, in which fuel is injected into exhaust 108 from the ICE 101 by a hydrocarbon doser 114 as the exhaust 108 enters the aftertreatment system 102. The fuel-injected exhaust 108 reacts with an oxidation catalyst included in the aftertreatment system 102, thereby producing a large amount of heat that effectively burns away the residue accumulated within the aftertreatment system 102. When a controller 103 determines that an aftertreatment regeneration process may be necessary, the controller 103 transmits an aftertreatment regeneration request 207 to an aftertreatment regeneration system 200. The aftertreatment regeneration system 200 receives various inputs from the machine 100 and generates predicted future states of the aftertreatment system 102. Based on the various inputs and the predicted future states of the aftertreatment system 102, a model predictive controller 117 included in the aftertreatment regeneration system 200 generates optimal control points for actuating the hydrocarbon doser 114 such that a target temperature and target duration of time for the aftertreatment process are achieved as efficiently as possible.

Figure 3:
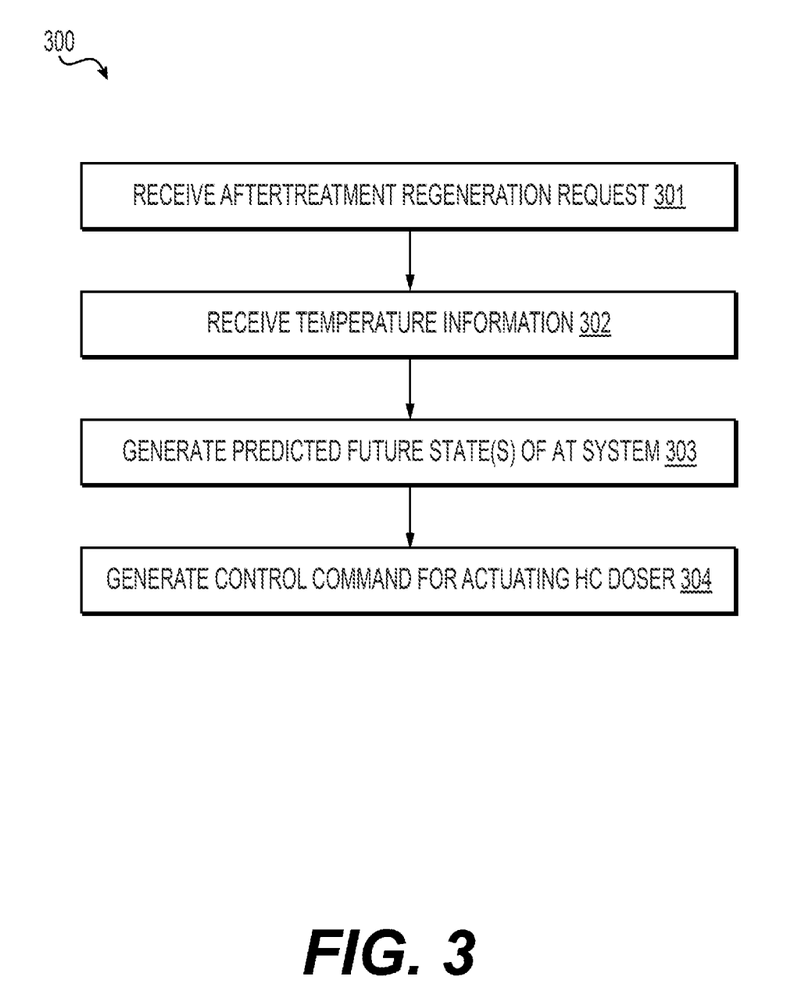
FIG. 3 depicts a flowchart of a method associated with the aftertreatment regeneration system.

FIG. 3 depicts a flowchart of a method 300 associated with an aftertreatment regeneration system. In some instances, as depicted in FIG. 3 the method 300 begins with step 301, in which an aftertreatment regeneration system 200 receives an aftertreatment regeneration request 207 from a controller 103. For example, an electronic control module (ECM) 115 may determine that an aftertreatment regeneration process for an aftertreatment system 102 operatively coupled to an ICE 101 may be necessary because the ICE 101 has been in operation for a threshold number of hours, because a threshold amount of particulate matter has accumulated in the aftertreatment system 102, or for any other suitable reason. The ECM 115 then generates and transmits an aftertreatment regeneration request 207 to the aftertreatment regeneration system 200. In this example, the aftertreatment regeneration request 207 includes a target temperature for the aftertreatment regeneration process and a target duration of time associated with the target temperature. In this example, the aftertreatment regeneration request 207 is received by a projection generator 201 and used to generate a trajectory projection 208 over a time horizon including five future time steps.

In some instances, as depicted in FIG. 3, after the aftertreatment regeneration system 200 receives the aftertreatment regeneration request 207, the method 300 continues with step 302, in which the aftertreatment regeneration system 200 receives temperature information from one or more temperature sensors via sensor signals 209. In this example, the aftertreatment regeneration system 200 receives temperature information from a first temperature sensor 118A located upstream of the aftertreatment system 102 and temperature information from a second temperature sensor 118B located downstream of the aftertreatment system 102, as depicted in FIG. 1. In some instances, the aftertreatment regeneration system 200 additionally or alternatively generates one or more estimated internal temperatures of the aftertreatment system 102, as described above. In this example, the aftertreatment regeneration system 200 generates estimated internal temperatures of the aftertreatment system 102 at three locations: a first estimated internal temperature of the OC 110 near the inlet end of the OC 110, a second estimated internal temperature of the OC 110 near the middle of the OC 110, and a third estimated internal temperature of the OC 110 near the outlet end of the OC 110.

As depicted in FIG. 3, after the aftertreatment regeneration system 200 receives temperature information from one or more temperature sensors and additionally or alternatively generates one or more estimated internal temperatures, the method 300 may continue with step 303, in which the aftertreatment regeneration system 200 generates, based at least in part on the aftertreatment regeneration request 207 (e.g., the trajectory projection 208 generated using the aftertreatment regeneration request 207) and the temperature information generated by the one or more temperature sensors, one or more predicted future states 211 of the aftertreatment system 102 (e.g., one or more predicted future temperatures of the aftertreatment system 102). In this example, using the trajectory projection 208, the temperature information received from the temperature sensors 118A and 118B, and the three estimated internal temperatures of the aftertreatment system 102, the aftertreatment regeneration system 200 generates a predicted future temperature of the aftertreatment system 102 for each of the five future time steps included in the time horizon of the trajectory projection 208.

Method 300 may continue with step 304, in which the aftertreatment regeneration system 200 generates, based at least in part on the aftertreatment regeneration request 207, the temperature information generated by the one or more temperature sensors, and the one or more predicted future states 211 of the aftertreatment system 102, a control command for actuating the HC doser 114. In this example, using the trajectory projection 208, the temperature information received from the temperature sensors 118A and 118B, the three estimated internal temperatures of the aftertreatment system 102, and the five predicted future temperatures of the aftertreatment system 102, the aftertreatment regeneration system 200 generates or otherwise identifies multiple sets of candidate control points for actuating the HC doser 114 in order to meet the target objective(s) dictated by the aftertreatment regeneration request 207 (e.g., the target temperature and the target duration of time associated with the target temperature). In this example, the multiple sets of candidate control points are identified using a gradient search.

After generating the sets of candidate control points, the aftertreatment regeneration system 200 evaluates each set of candidate control points using cost information stored within the cost function 206, as described above. Finally, in this example, the optimizer 205 selects the set of candidate control points associated with the lowest cost as an optimal set of control points. The aftertreatment regeneration system 200 can then output the optimal set of control points 213 to an actuator controller 116 for actuating the HC doser 114 according to the optimal set of control points. It should be understood that the steps of method 300 may be performed in any other suitable order, simultaneously, effectively simultaneously, or recursively.

As mentioned above, the aftertreatment regeneration system 200 of the present disclosure may facilitate safer and more efficient aftertreatment regeneration processes for aftertreatment systems of machines that include internal combustion engines. For example, as mentioned above, a typical aftertreatment regeneration process specifies a target temperature (or a target range of temperatures, as described above) and a target duration of time associated with the target temperature. The target temperature must be reached and maintained for the duration of the target duration of time for the aftertreatment regeneration process to be completed. However, as mentioned above, if the temperature of the exhaust 108 within an aftertreatment system 102 becomes too high, the aftertreatment system 102 may be damaged. Conversely, if the temperature of the exhaust 108 within the aftertreatment system 102 is too low, the aftertreatment regeneration process will be prolonged, thereby wasting fuel and increasing the amount of undesirable emissions.

Figure 4A:
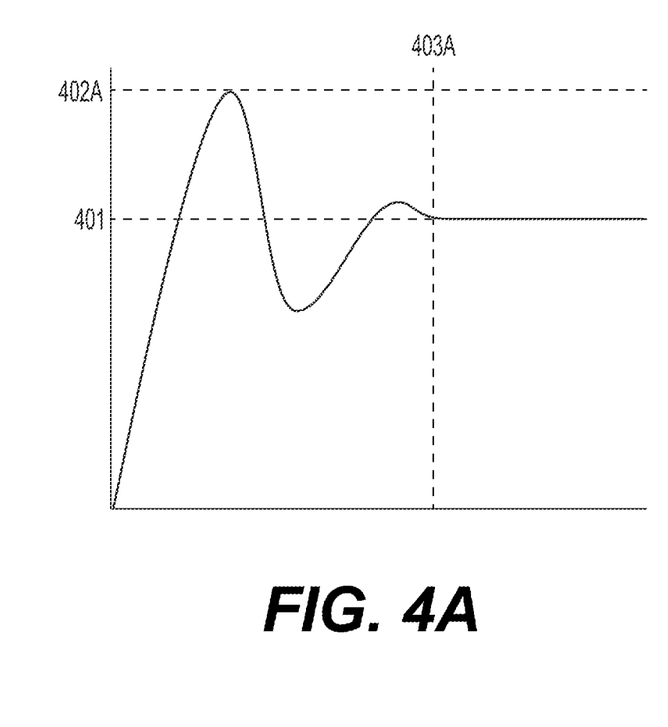
FIGS. 4A and 4B depict exemplary graphs of aftertreatment regeneration processes.

FIG. 4A depicts an example of a sub-optimal aftertreatment regeneration process, e.g., an aftertreatment regeneration process controlled by a PID controller and without the use of an MPC controller. In the example depicted by FIG. 4A, because the PID controller is not able to control the aftertreatment regeneration process in an anticipatory manner, and because the PID controller considers the temperature of the exhaust 108 at only one position (e.g., an outlet temperature), the PID controller causes the temperature of the exhaust 108 within the aftertreatment system 102 to significantly overshoot the target temperature 401 to a maximum temperature 402A, thereby putting the health of the aftertreatment system 102 at risk. In this example, to compensate for overshooting the target temperature 401, the PID controller then aggressively attempts to cool the temperature of the exhaust 108 within the aftertreatment system 102, and significantly undershoots the target temperature 401 as a result. Ultimately, the regeneration activation time 403A (e.g., the point in time at which the target duration of time associated with the target temperature 401 begins) is delayed, causing the aftertreatment regeneration process to be prolonged.

Figure 4B:
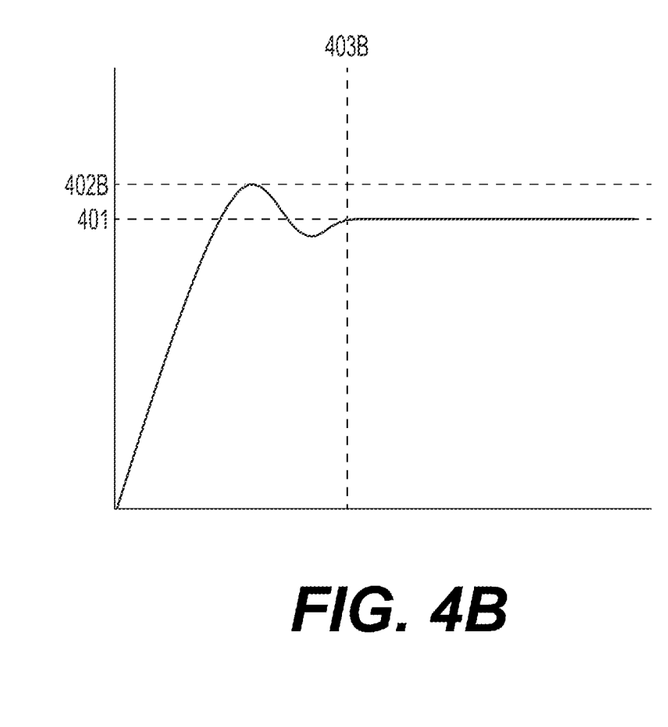

FIG. 4B depicts an example of an optimized aftertreatment regeneration process controlled by an aftertreatment regeneration system 200. In the example depicted by FIG. 4B, because the aftertreatment regeneration system 200 is able to control the aftertreatment regeneration process in an anticipatory manner, and because the MPC of the aftertreatment regeneration system is able to simultaneously consider the temperature of the exhaust 108 at multiple positions (e.g., an inlet temperature and an outlet temperature), the maximum temperature 402B of the exhaust 108 within the aftertreatment system 102 does not significantly overshoot the target temperature 401. In addition, the temperature of the exhaust 108 therefore does not need to be aggressively cooled. Ultimately, the regeneration activation time 403B of the aftertreatment regeneration process controlled by the aftertreatment regeneration system 200 is reached earlier than the regeneration activation time 403A of the aftertreatment regeneration process controlled by the PID controller, thereby shortening the aftertreatment regeneration process and saving fuel accordingly.

It will be apparent to those skilled in the art that various modifications and variations can be made to the disclosed method and system without departing from the scope of the disclosure. Other embodiments of the method and system will be apparent to those skilled in the art from consideration of the specification and practice of the systems disclosed herein. It is intended that the specification and examples be considered as exemplary only, with a true scope of the disclosure being indicated by the following claims and their equivalents.

What is claimed is:

1. An aftertreatment regeneration system comprising:
an aftertreatment system;
a temperature sensor operative to monitor a temperature of the aftertreatment system;
a hydrocarbon doser operatively coupled to the aftertreatment system; and
a model predictive controller operative to:
receive an aftertreatment regeneration request;
receive temperature information generated by the temperature sensor;
generate, based on the aftertreatment regeneration request and the temperature information generated by the temperature sensor, a predicted future state of the aftertreatment system;
generate, based on the aftertreatment regeneration request, the temperature information generated by the temperature sensor, and the predicted future state of the aftertreatment system, a control command for actuating the hydrocarbon doser; and
linearize the model of the aftertreatment system before and after generating the control command for actuating the hydrocarbon doser.

2. The aftertreatment regeneration system of claim 1, wherein the model predictive controller is further operative to:
   generate, based on the aftertreatment regeneration request and the temperature information generated by the at least one temperature sensor, a plurality of predicted future states of the aftertreatment system for a respective plurality of future time steps; and
   generate the control command for actuating the hydrocarbon doser based on the plurality of predicted future states of the aftertreatment system.

3. The aftertreatment regeneration system of claim 1, further comprising a model of the aftertreatment system and wherein the controller is further operative to access the model of the aftertreatment system and generate the predicted future state of the aftertreatment system using the model of the aftertreatment system.

4. The aftertreatment regeneration system of claim 1, wherein the aftertreatment regeneration request includes a target temperature and a target duration of time associated with the target temperature.

5. The aftertreatment regeneration system of claim 1, further comprising at least two temperature sensors operative to monitor the temperature of the aftertreatment system, wherein the aftertreatment system includes an oxidation catalyst, and wherein the temperature information includes temperature information from a first temperature sensor upstream of the oxidation catalyst and from a second temperature sensor downstream of the oxidation catalyst.

6. The aftertreatment regeneration system of claim 1, wherein the controller is further operative to:
   generate an estimated internal temperature of the aftertreatment system; and
   generate the predicted future state of the aftertreatment system based on the aftertreatment regeneration request, the temperature information generated by the at least one temperature sensor, and the estimated internal temperature of the aftertreatment system.

7. The aftertreatment regeneration system of claim 6, wherein the estimated internal temperature of the aftertreatment system is generated using a model of the aftertreatment system.

8. The aftertreatment regeneration system of claim 6, wherein the model predictive controller is further operative to:
   generate a plurality of estimated internal temperatures of the aftertreatment system for a respective plurality of positions within the aftertreatment system; and
   generate the predicted future state of the aftertreatment system based on the aftertreatment regeneration request, the temperature information generated by the at least one temperature sensor, and the plurality of estimated internal temperatures of the aftertreatment system.

9. The aftertreatment regeneration system of claim 1, wherein the model predictive controller is further operative to:
   evaluate multiple sets of candidate control points and a select a set of control points from the multiple sets of candidate control points that optimizes a cost function; and
   generate the control command for actuating the hydrocarbon doser based on the set of control points selected from the multiple sets of candidate control points.

10. A method for controlling an aftertreatment regeneration process for an aftertreatment system including an aftertreatment system and a hydrocarbon doser operatively coupled to the aftertreatment system, the method comprising:
   receiving an aftertreatment regeneration request;
   receiving temperature information generated by at least one temperature sensor operative to monitor a temperature of the aftertreatment system;
   generating a plurality of estimated internal temperatures of the aftertreatment system for a respective plurality of positions within the aftertreatment system;
   generating a plurality of predicted future states of the aftertreatment system based on the aftertreatment regeneration request, the temperature information generated by the at least one temperature sensor, and the plurality of estimated internal temperatures of the aftertreatment system, wherein the plurality of predicted future states of the aftertreatment system includes at least three predicted future states generated for at least three future time steps; and
   generating, based on the aftertreatment regeneration request, the temperature information generated by the at least one temperature sensor, and the plurality of predicted future states of the aftertreatment system, a control command for actuating the hydrocarbon doser.

11. The method of claim 10, wherein the temperature information includes temperature information from a first sensor upstream of the aftertreatment system and from a second temperature sensor downstream of the aftertreatment system.

12. The method of claim 10, wherein the plurality of estimated internal temperatures of the aftertreatment system includes a first estimated internal temperature proximate an inlet end of the aftertreatment system and a second estimated internal temperature proximate an outlet end of the aftertreatment system.

13. The method of claim 12, wherein the plurality of estimated internal temperatures further includes a third estimated internal temperature proximate a particulate filter of the aftertreatment system.

14. A model predictive controller for controlling an aftertreatment regeneration process for a machine including an aftertreatment system and a hydrocarbon doser operatively coupled to the aftertreatment system, operative to:
   receive an aftertreatment regeneration request;
   receive temperature information generated by at least one temperature sensor operative to monitor a temperature of the aftertreatment system;
   generate, based on the aftertreatment regeneration request and the temperature information generated by the at least one temperature sensor, a predicted future state of the aftertreatment system; and
   generate, based on the aftertreatment regeneration request, the temperature information generated by the at least one temperature sensor, and the predicted future state of the aftertreatment system, a control command for actuating the hydrocarbon doser,
   wherein the control command is generated at least in part using a cost function, and
   wherein generating the control command using the cost function comprises:
      evaluating multiple sets of candidate control points based on one or more soft constraints used to rank the multiple sets of candidate control points;
      selecting a set of control points from the multiple sets of candidate control points that optimizes the cost function; and generating the control command for actuating the hydrocarbon doser based on the set of control points selected from the multiple sets of candidate control points.

15. The model predictive controller of claim 14, further operative to access a model of the aftertreatment system and use the model of the aftertreatment system to generate the predicted future state of the aftertreatment system.

16. The model predictive controller of claim 14, wherein the model predictive controller is a constrained model predictive controller.

* * * * *